INVENTOR.
A. J. GASS

July 18, 1967    A. J. GASS    3,331,183
SEALING PACKAGES
Filed June 24, 1964    6 Sheets-Sheet 3
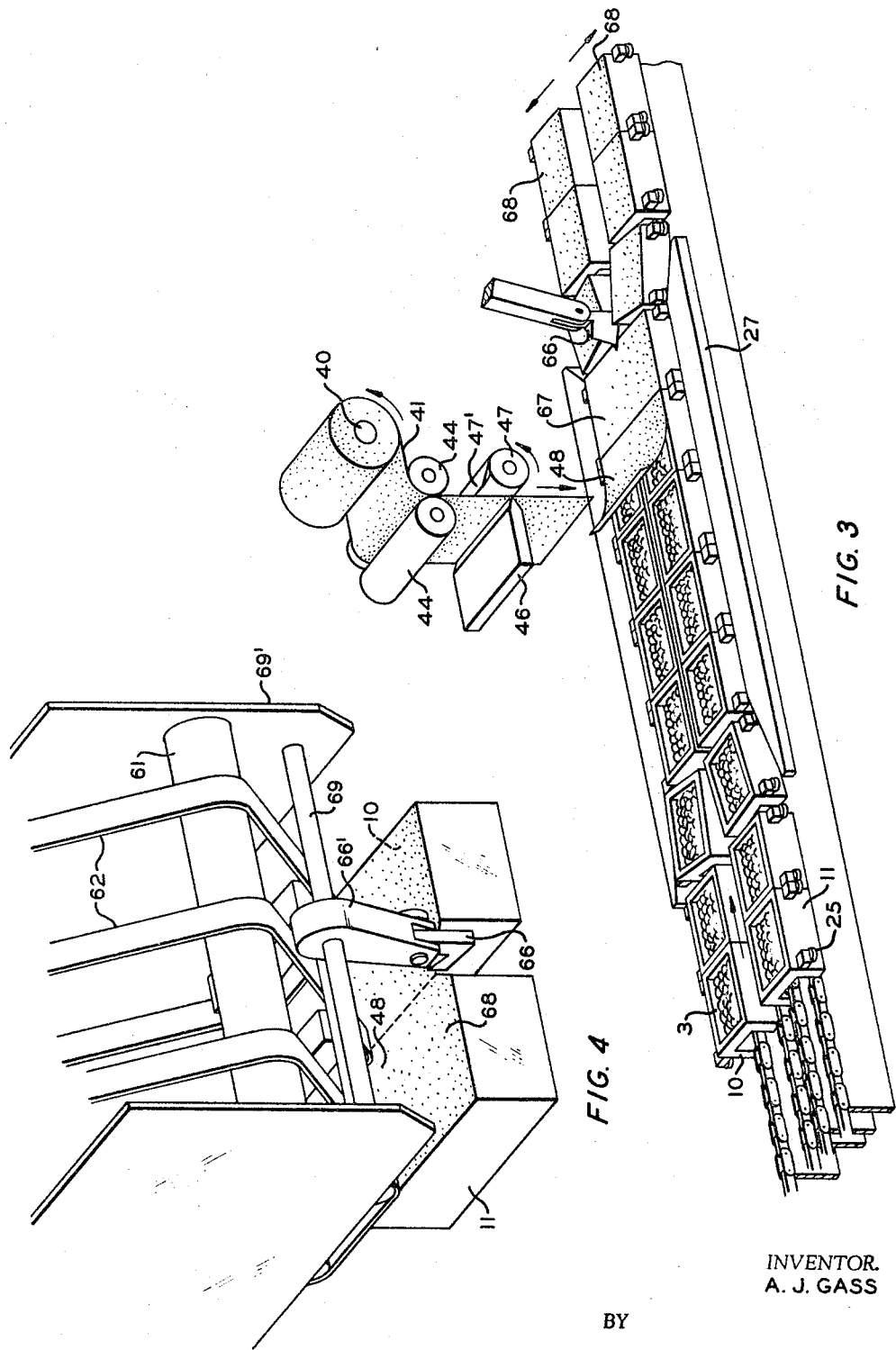
INVENTOR.
A. J. GASS
BY
ATTORNEYS July 18, 1967  A. J. GASS  3,331,183
SEALING PACKAGES Filed June 24, 1964  6 Sheets-Sheet 5

INVENTOR.
A. J. GASS
BY
ATTORNEYS

July 18, 1967  A. J. GASS  3,331,183
SEALING PACKAGES

Filed June 24, 1964  6 Sheets-Sheet 6

INVENTOR.
A. J. GASS
BY
ATTORNEYS

United States Patent Office 3,331,183
Patented July 18, 1967

3,331,183
SEALING PACKAGES
Andrew J. Gass, Summit, N.J., assignor to Phillips Petroleum Company, a corporation of Delaware
Filed June 24, 1964, Ser. No. 377,671
15 Claims. (Cl. 53—37)

This invention relates to a method for closing packages or containers. This invention also relates to apparatus for closing packages or containers. In one of its aspects this invention relates to a method and apparatus for closing packages wherein at least two parallel rows of packages are supported in form fitting bottomless pockets so that bulging of the sides of said packages upon loading same with material and/or shaping and/or compacting said loaded material is eliminated. In another of its aspects this invention relates to a method and apparatus for closing thermoplastic packages wherein at least two parallel rows of packages are covered by a single sheet of material after said two rows of packages have been transversely forced together so that they travel in a very close side-by-side relationship when they are covered by said single cover sheet. Another aspect relates to the method and apparatus as above wherein at least one unitary source of cover material and a single cover registering and lay down device is utilized to cover at least two rows of separate packages. Another aspect of the invention relates to the method and apparatus as above wherein the two rows of package-containing pockets covered by the single cover sheet are temporarily attached to said cover sheet and then said cover sheet is severed along the longitudinal axis and in between said rows to produce two separate packages with two separate cover sheets attached thereto in two separate pockets. In another of its aspects this invention relates to the heat sealing of thermoplastic packages wherein individual heat sealers are applied to each package in at least one row of package-containing pockets to produce a heat seal on at least some part of said package and wherein, after said heat sealing is effected and said heat sealer removed, a cooling article is applied to each of said heat seals which remains in contact with said heat seals during a predetermined length of longitudinal travel of said package-containing pockets, after which said cooling article is removed from said heat seal and returned to a zone wherein said cooling article is recooled in order to ready said article to contact and cool a new and different heat sealed portion. In another aspect this invention relates to apparatus for sealing thermoplastic packages wherein is provided at least two parallel rows of individual pockets that are open at the top and the bottom, but are adapted so that the interior walls of said pockets conform, abut and support the side and at least part of the end walls of an empty package which is placed in said pocket prior to filling and sealing same. Another aspect of this invention relates to the pocket apparatus as above wherein each of two separate but parallel pockets is slidably connected and forced apart by resilient means and wherein is provided on the sides of each pocket opposite from the side which contains said slidable connection at least one rotating member which will coact with at least one suitable guide means to transversely force the two pockets as close to a side-by-side abutting relation as is possible, support said pockets during their longitudinal movement through the apparatus hereinabove stated, and/or maintain said pockets in a level line of travel, thereby eliminating vertical and/or horizontal deviations from said line of travel. Yet another aspect of this invention relates to pockets as above wherein is provided a resilient back-up member in between the top of said pocket and a part of said package which rests on the top of said pocket, said member being either chamfered, contoured or set back from said package a sufficient distance to effect a stable and continuous supporting connection between said package and said pocket top.

Thermoplastic films and sheet materials, e.g. polyethylene, are very useful for packaging many types of commodities, for example, food products. One of the advantages of the use of thermoplastic materials is that heat sealing can be utilized to fabricate and seal the packages, be they bags, boxes, wrappings, etc. In such packaging operations, it is highly desirable to seal by a single operation as many packages as is possible and to seal such packages in a continuous manner, thereby effecting a very high quantum of productivity. Heretofore, when two or more parallel rows of unsealed packages have been employed in a sealing process, two or more separate rolls of cover material, i.e. a number of rolls equivalent to the number of lateral rows of pockets in a conveyor lane, have been utilized and separate sheets of material from said separate rolls have been fed through draw rollers or other feeding devices and then cut to desired lengths by various methods, such as shear, rotating knife, guillotine, etc., for application of each separate sheet to each lateral row of package containing pockets.

The use of multiple cover material rolls and the accompanying duplication of certain equipment required is functionally acceptable, although fiscally undesirable, if there is no printing on the cover material. However, the above apparatus is totally unacceptable if such printing is present, because additional duplication of equipment is required, i.e. two separate sets of register controls would be required along with the two separate cover material feed rollers, two separate feed rollers, corrugator and knife cutter assemblies, and separate drive components.

If a single (double width) cover material roll were slit and used, all of the problems hereinabove mentioned would not be solved, since it would be necessary to feed the cover material through a differential belt system at spreading angles to avoid tacking of one piece of slit cover material to another. Also, if a section were to be cut from the cover material roll, it would be necessary to dispose of the waste and suffer a high percentage of loss thereby.

According to one concept of this invention, several rows of individual but parallel packages may be sealed by a printed cover material by utilizing a single registering device in conjunction with one set of feed rollers, one set of corrugating rollers, one knife assembly, one differential belt feed and lay down system and one tacking device. According to this invention, if suitably positioned cutting means are utilized with the above mentioned apparatus along with apparatus providing the ability to squeeze the parallel rows of pockets together, forming a single lane, at least during the lay down and tacking operation a single apparatus and a single cover material roll can be utilized to cover several rows of separate packages with, ultimately, individual covers while at the same time preventing any overlapping or bridging of cover material between the separate packages, preventing tacking of the cover for one package to another package, avoiding angular feed of cover material, avoiding waste of said cover material and increasing the overall productivity of the operation. Yet further advantages of the use of a single roll of material, especially when a reserve roll of material is provided, regardless of the number of parallel rows of package-containing pockets employed in a single conveyor lane, are that less handling of the material is involved, fewer spools and less fly splicing is needed, fewer machine stops due to lack of uniformity is achieved and lower material cost is realized.

Thus, according to the above mentioned concept, a simplified method and apparatus are provided to substantially simultaneously cover multiple rows of containers or packages passing side-by-side through a cover registering and applying apparatus or zone in a substantially continuous manner. The invention, therefore, effects an ultimate result of continuously covering a multiplicity of packages or containers by the use of a single sheet feed roll which would be normally utilized to apply a single cover to a single package rather than multiple covers to multiple packages. These results are achieved primarily by passing the single sheet of cover material through apparatus hereinafter described which applies the single sheet of cover material to the packages in registered relation and then temporarily attaches said single sheet to the several packages in the several pockets, which said sheet covers and finally slitting said sheet in a manner such that each individual package emerges with an individual cover temporarily attached thereto. Also, in this aspect of the invention, it is possible to slit the sheet of cover material prior to cutting said sheet into a desired length and feeding the cut sheet to the differential belt feed for lay down on said packages. For example, the slitting may be accomplished between the feed rollers and corrugating rollers above mentioned, although it is preferred that the slitting or severing take place after the single sheet has been temporarily attached to several of the packages as described hereinabove. Severing of the single sheet after tack sealing of same to a multiplicity of packages is preferred since slitting prior to laying and tack sealing of the cover to the packages may occasionally cause misalignment of the cover relative to the packages and the subsequent tack sealing would then join part of the cover of one package to the adjacent package. This occassional misalignment problem is totally obviated by slitting after the tack sealing operation.

Another part of this concept of the invention involves the forcing or squeezing of the parallel rows of pockets transversely to a point of closest possible physical approach of the parallel pockets prior to application of the unitary cover sheet and maintaining this close side-by-side relationship of the parallel pockets during the subsequent temporary attaching of said unitary cover to said packages and longitudinal severing of said unitary cover to form individual covers on the individual packages. The pockets at their point of closest approach or substantially abutting or substantially contiguous are then separated transversely by any suitable means after the slitting operation. Although the step of forcing the parallel pockets together has been described as being accomplished just prior to the application of the cover material and the forcing of the pockets apart again has been described as just after the severing operation has been accomplished, it is within the scope of this invention to force the pockets together a considerable distance and time before said pockets approach the cover application operation, for example, at or before the container filling area, and the separating of the pockets may be deferred until after the heat sealing of the packages or containers or even after the cooling of the heat seals and prior to removal of said containers from said pockets. It is also within the scope of this aspect of the invention to support the bottoms of the containers in the bottomless pockets during the time in which the contents of said packages is placed therein and even later when said contents may be leveled and/or compacted in said containers. This type of support will prevent bulging of the bottoms of the containers as well as the sides of same. Furthermore, it is within the scope of this aspect of the invention to provide multiple reciprocating plates or flaps or rollers which intermittently fold over the filled package or container and compact or mound the material in the container while the bottom of said container is supported as discussed hereinabove.

According to another concept of this invention, more than one conveyor lane consisting of multiple rows of pockets and packages therein may be utilized and for each lane so utilized there is provided another roll of cover material which is fed through, corrugated and cut by the same rollers and mechanism that feeds, corrugates and cuts the first roll of cover material. Thus a single set of feed rolls, corrugators, etc., may be utilized for two or more rolls of cover material, each roll of which is utilized to cover several rows of packages in the conveyor lane to which that roll is adapted while simultaneously the second roll covers a separate multiplicity of parallel rows of packages in a second conveyor lane. Furthermore, whenever a single roll is utilized, there may be adapted in reserve relation thereto another roll of cover material which will be immediately spliced on to the end of the first roll, thereby eliminating the need to stop the machine when the first roll of cover material is exhausted.

According to another concept of this invention, an improved method and apparatus of conveying empty containers through various operations such as filling, sealing, etc., is achieved by providing the pockets which hold the formed containers and convey same through the above mentioned operations with solid or perforated side and/or end walls or spaced supporting ribs which fit the shape of the side and/or end walls of the container, thus preventing wall bulge and/or flange distortion of the container. Such an improvement is significant, since, normally, formed containers are supported primarily by outwardly extending flanges formed from the upper extremities of their side and end walls. Also, normally the pockets that contain and convey the formed containers consist of a thin plate upon which the container flange rests. The use of such a plate allows the side walls and end walls of the container to bulge out slightly when the container is filled due to the weight and/or pressure of the contents and subsequent compacting operations. The above-mentioned wall bulging has collateral effects which cause the flange to distort slightly, thus creating problems in effecting good lid seals as well as interfering with accurate filling of the container. Thus, accurate and improved heat seals result from applicant's invention which provides a conveyor pocket of such depth and contour that it supports the formed container in such a manner that deformation of the side and/or end walls of said container is not possible under normal conditions. Such a conveyor pocket provides an opportunity to adjust and/or compact the contents of the container wtihout deformation of the side walls of said container and without distorting the flange portion of the container which rests upon the pocket. The non-distortion of the flange also results in the advantage that a uniform flange is presented to the cover material, thereby maintaining a constant and uniform periphery of the finished and covered container. The improved pocket of this invention is also applicable to problems encountered with the use of deep containers, the primary two of which are "blow through," which results where the momentum of the product during the container filling operation is high and, therefore, literally blows the container out of the bottom of the pocket, and "fall through," where the weight of the material in the container becomes so excessive that the container and its contents simply fall through the bottomless pocket. Thus, in this inventive concept, the invention contemplates the use of a bottomless pocket which is of sufficient depth tand shape or contour in its inner walls to suit the shape or contour of the formed container placed therein for subsequent filling, sealing, etc.

According to another concept of this invention, forced cooling after heat sealing is effected, thereby accelerating the dissipation of heat from the seal and firmly setting the seal pattern to thereby maintain uniformity of the container without curling. More specifically, this aspect of the invention, involving improved and more uniform sealing, is achieved by heat sealing each individual temporarily attached cover to each individual package by a heating means which contacts said packages and covers and follows said packages for a predetermined length of time and distance along the line of travel of said packages and which is retracted at a predetermined point along said line of travel. The new and still hot heat sealed portions of the packages are then substantially immediately contacted by a cold article which contacts the heat sealed portion and travels along the line of travel of said packages for a predetermined length of time to effect rapid dissipation of heat from the heat sealed portions and prevent distortion thereof. The cooling article or head is retracted from the sealed portion at a predetermined time and returned past and in contact with a cooling zone to recool same for reuse on a new and, therefore, hot sealed portion.

According to another concept of this invention, there is provided a resilient back-up member along the top of each pocket so that when the container is placed in said pocket a flanged portion on the upper edges of said container rests upon said back-up member to provide a resilient support for said container flange and effect a stable transition from the top of said pocket to the bottom of said container flange. When said container flange is curved, it is necessary to either set back the back-up member from the interior edge of said pocket to allow for this curvature or contour or chamfer of said back-up member to accommodate the curvature of the container flange. If the back-up member is of insufficient height to fully accommodate the entire curvature of the container flange, the upper interior edge of the pocket itself can be recessed, chamfered or curved in an amount sufficient to make up for such insufficient height.

Accordingly, it is an object of this invention to avoid waste of cover material in a package or container sealing operation. It is another object of this invention to prevent package bridging and still provide sufficient room to effect a substantial seal when sealing at least two parallel rows of packages. It is another object of this invention to maintain register of cover print to the container or package with a single registering device in a pocket conveyor containing at least two parallel rows of pockets in a single conveyor lane. It is another object of this invention to produce a sealed package of uniform overall configuration.

Other aspects, objects and the several advantages of the invention will become apparent to those skilled in the art upon a study of this disclosure, drawing and the appended claims.

A better understanding of this invention and all of its aspects and advantages will be achieved by reference to the drawings, of which:

Figure 1:
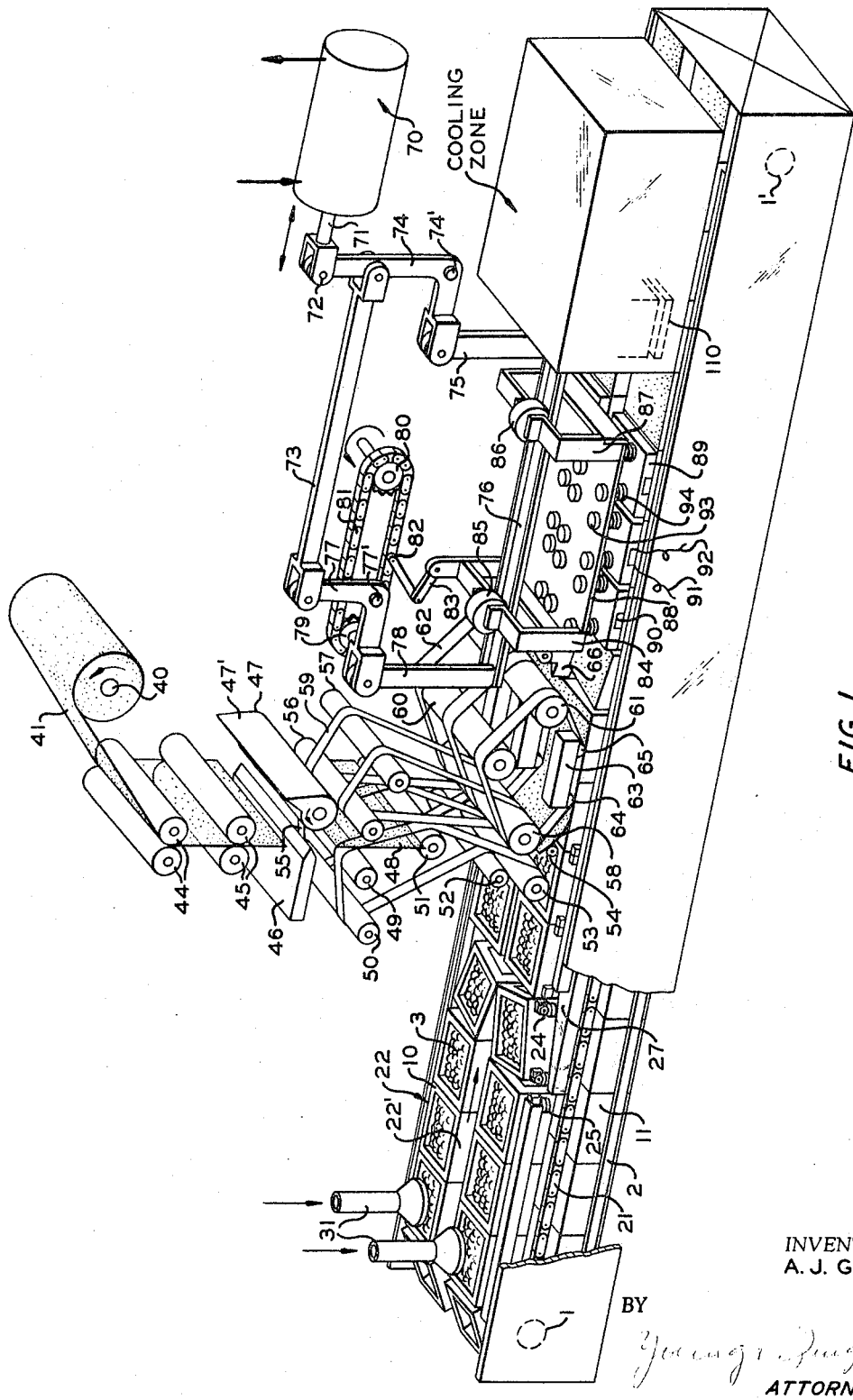
FIGURE 1 is an isometric view, partially diagrammatic, of the complete heat sealing machine of this invention.
Figure 5:
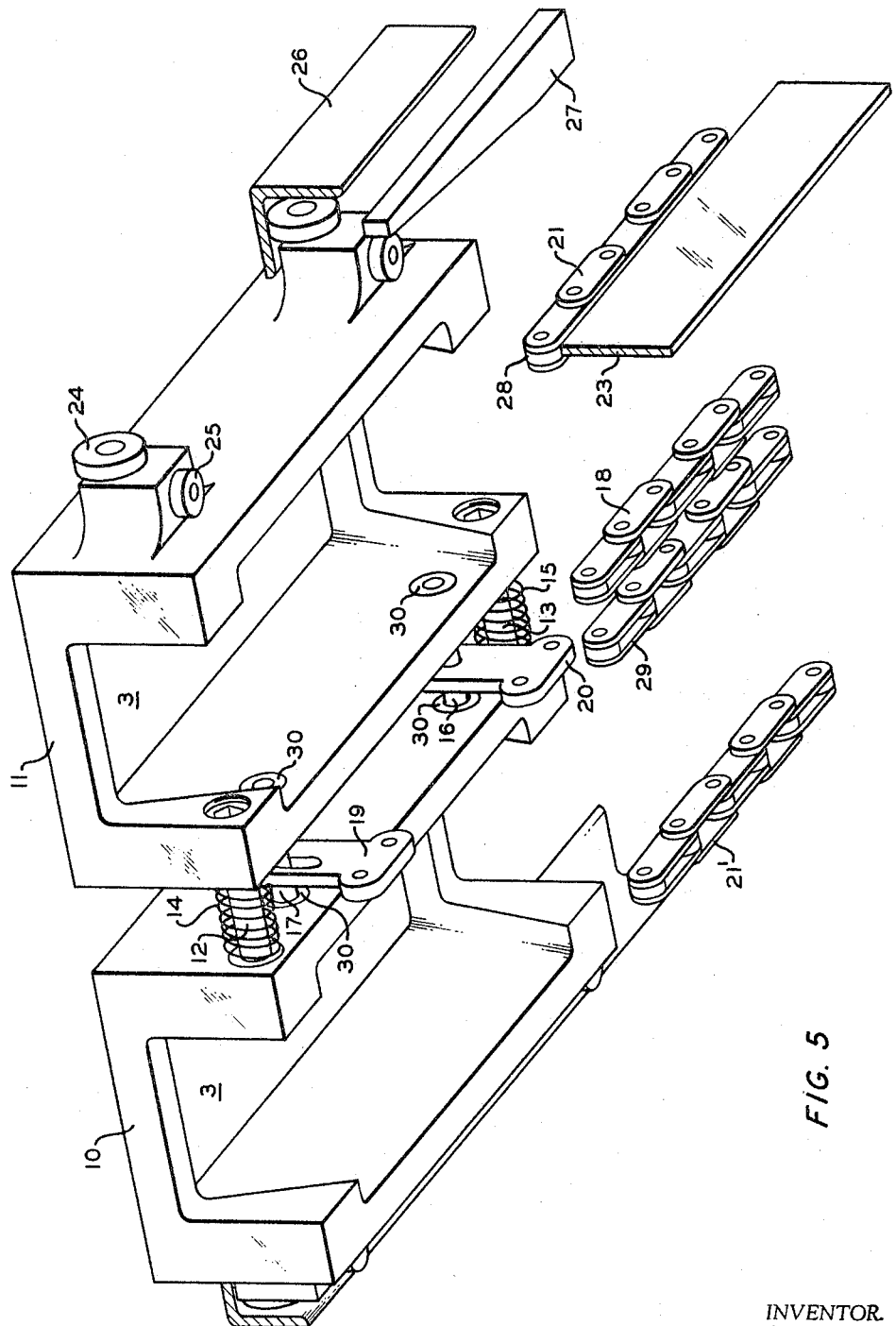
Figure 8:
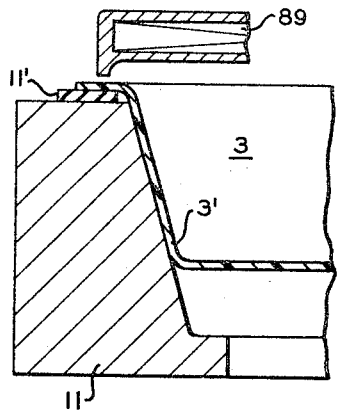
Figure 9:
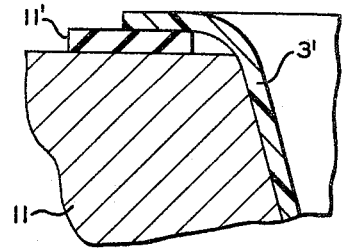
Figure 10:
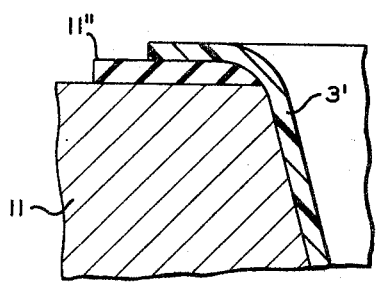
Figure 11:
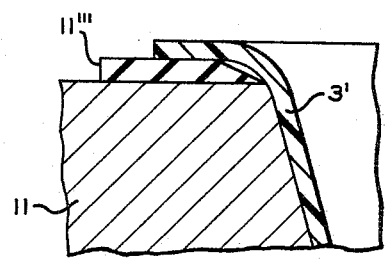
Figure 6:
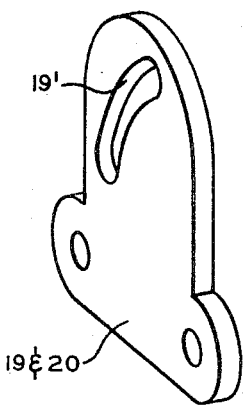
Figure 7:
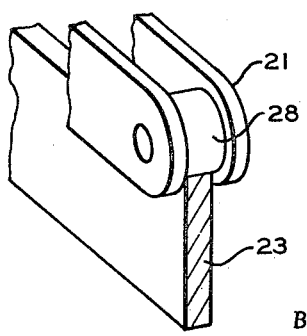
Figure 12:
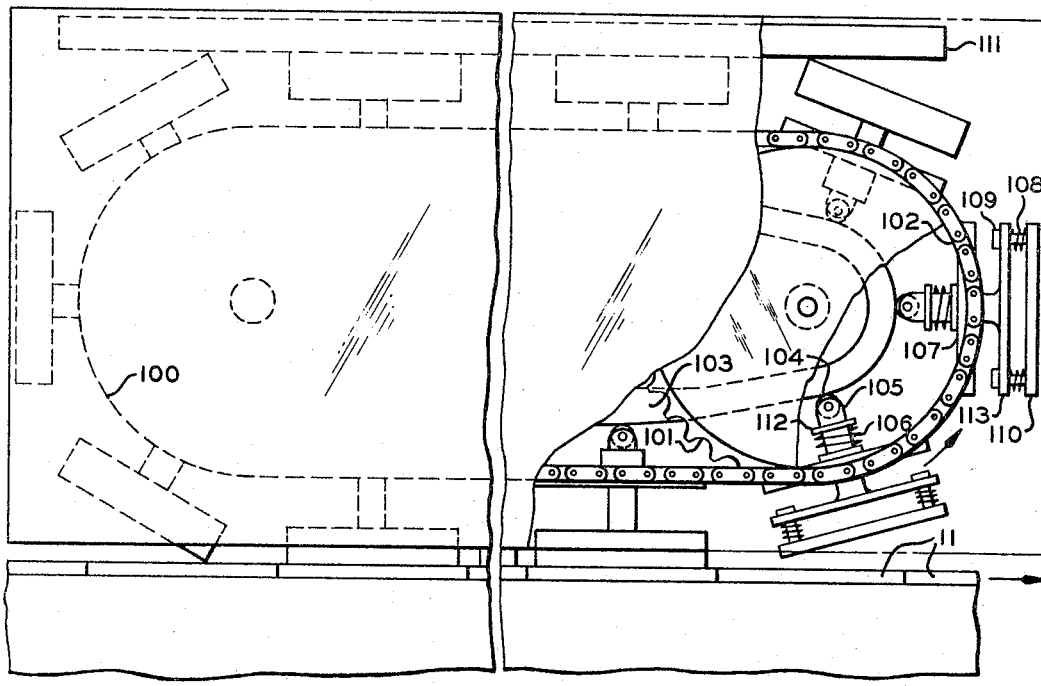
Figure 13:
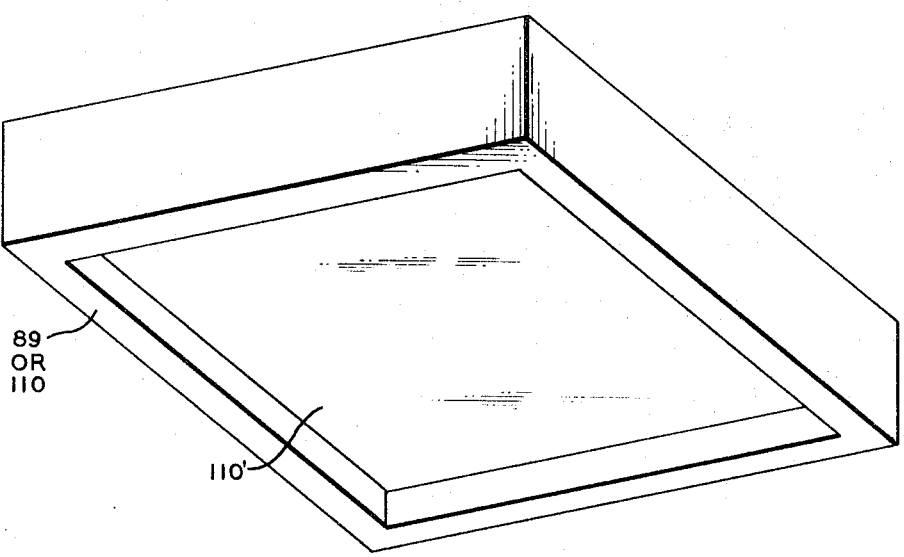

FIGURE 3 is a schematic representation of the apparatus and method employed for forcing or squeezing two parallel rows of package-containing pockets transversely together, applying a single sheet of cover material to the two parallel pockets and packages therein, cutting the single sheet of cover material longitudinally to form separate covers on each of the two parallel packages and, finally, transversely separating the two pockets;

FIGURE 4 is a schematic representation of the preferred position of the cover material cutter;

FIGURE 5 is a schematic representation showing two container pockets viewed from a position within the conveyor enclosure and slightly below the level of these pockets as they progress through the machine of FIGURE 1 on the upper level of the main conveyor;

FIGURE 6 is a schematic representation of the connecting means between the pockets and conveying chain of FIGURE 5;

FIGURE 7 is an end view of a conveying chain and its support of FIGURE 5;

FIGURE 8 is an end view of a pocket with a container placed therein and a back-up member between the top surface of the pocket and the bottom surface of the container flange;

FIGURE 9 is an enlarged view of the back-up member portion of FIGURE 8 wherein the back-up member is rectangular and set back from the interior edge of the pocket to allow for the curvature of the container flange;

FIGURE 10 is an enlarged view of the back-up member portion of FIGURE 8 wherein the back-up member is contoured to conform with the curvature of the container flange;

FIGURE 11 is an enlarged view of the back-up member portion of FIGURE 8 wherein the back-up member is chamfered to accommodate the curvature of the container flange;

FIGURE 12 is a diagrammatic side view of the cooling apparatus of FIGURE 1;

FIGURE 13 is a schematic representation of the configuration utilized for both the cooling head and the heating head in order to allow mounding of the material in the container.

As illustrated in FIGURE 1, there is provided a chain conveyor 22, provided with one or more chains 21, and traversing sprockets 1 and 1', in such a manner that when pockets are affixed to the chain they will travel through the full operation of said machine and then be returned to the starting point of the operation for another traverse thereof. Affixed to conveyor 22 are two parallel rows of bottomless supporting pockets 10 and 11, which pockets contain a central opening 3 adapted to receive and support packages or containers to be filled and sealed by the machine. As shown in FIGURE 1, pocket 11 has mounted on an exterior surface thereof rotating means 24 and 25, hereinafter described relative to FIGURE 5. Means 25 is adapted so as to coact with the cam rail 27. Means 24 is adapted to coact with rail 2 and thereby support said pocket on its return travel on the underside of conveyor lane 22 and can be adapted to coact with a supporting rail similar to that shown by reference numeral 2 in FIGURE 1 to support pocket 11 during any or all of the operations shown as applied to the top surface of conveyor 22.

From the original starting point of the overall operation the pockets are loaded with empty containers then pass to a charging area wherein the empty containers are filled with the contents ultimately to be sealed therein. Suitable contents charging apparatus is known to the art and is depicted in FIGURE 1 by means 31. The charging of the contents may even be done by hand, if desired. After the contents of the containers has been charged thereinto, pockets 10 and 11 may move the containers to a leveling and/or mounding and/or compacting operation (not shown) wherein the contents of the containers is adjusted therein. During this adjusting operation, the bottoms of the containers in bottomless pockets 10 and 11 may be supported by any suitable means, if desired.

When the contents of the containers are suitably adjusted, pockets 10 and 11 move the full containers to the covering operation. Just prior to reaching the covering operation, pockets 10 and 11 are transversely forced together forming a single lane, as is schematically shown in FIGURE 3 and described hereinafter. If desired, this transverse forcing together of the parallel pockets may be achieved at any earlier stage as heretofore discussed, for example, at the charging stage represented by reference numeral 31.

While pockets 10 and 11 are progressing toward the covering operation, roll 40 of cover material 41 is being fed by means of feed rollers 44 in a manner described hereinafter. This step forms a single cover sheet as is represented by reference numeral 48. The single cover sheet 48 is fed into differential feed belt apparatus which comprises belt 55 and opposing belt 59, which can either be a single wide belt or a multiplicity of narrower and parallel but separated belts and can be powered by a single power source, not shown. The differential feed belt apparatus then applies the single cover sheet 48 to at least two of the parallel pockets passing through the cover application apparatus, i.e. pockets 10 and 11, as shown in FIGURE 3. After the single cover sheet 48 has been placed upon the pockets and, therefore, the containers in pockets 10 and 11 by differential belt feeds 55 and 59, said single cover sheet is then temporarily attached or tacked to the containers, for example, to the container flanges, of both containers in pockets 10 and 11 while said cover sheet is still a unitary member. The temporary attaching is accomplished by means of at least one heat conducting band 62 which traverses rolls 58, 60, and 61, and is in contact with heating means 63 through rollers 64 and 65. Preferably, there are three tacking bands similar to band 62 made of metal and adapted so that a temporary attachment between the unitary cover sheet 48 and the two containers in pockets 10 and 11 is achieved on at least part of the containers in pockets 10 and 11, for example, on the edge of the container in pocket 11 on the side on which reside members 24 and 25, and on the edge of each container on each side of a line between the two pockets indicated by reference numeral 22'. The unitary cover sheet, after temporary attachment to the two or more containers, is longitudinally severed by means of cutter 66, for example, along the line represented by reference numeral 22'.

Pockets 10 and 11 are then moved to a heat sealing operation wherein individual heat sealing heads 89 are moved into contact with at least part of each container, preferably around the periphery of each package or container in each pocket, and are maintained in contact therewith as the pockets continue to move longitudinally toward the end of the conveyor 22. The heating contact time is sufficient to heat seal the individual cover sheet of each container to said package. After traveling with and in contact with the container for a predetermined length of time and travel, each heating head is retracted in a vertical and horizontal manner to reposition same to contact a new container and seal same. More specifically, member 88 supports the multiplicity of heating heads by means of members 93 so that when member 88 is lowered, heating heads are appled not only to the containers in pockets 10 and 11, but also to containers in pockets following pockets 10 and 11. Each heating head 89 is maintained in contact with each package by means of resilient members 94 on each member 93. Each heating head contains therein a heating member 90 which, for example, is connected to a source of electricity by means of wires 91 and 92. Member 88 is supported by travelers 84 and 87 and rotating members 85 and 86. Rotating members 85 and 86 travel along member 76, thus allowing member 88 and its attached heating heads 89 to follow along the travel of each pocket contacted by said heating heads for a distance determined by the relationship of sprockets 79 and 80. When rotating member 86 nears the downstream end of member 76, air cylinder 70 is automatically activated by means not shown to retract member 71 and thereby, by means of clevis 72 and member 73, to rotate bell cranks 74 and 77 about pivots 74' and 77' so that members 75 and 78 are raised, thereby raising member 76. Thus, member 76 is raised by members 75 and 78 and, therefore, all heating heads 89 are retracted from contact with each individual container at substantially the same time. While the heating heads are in a vertically retracted position, member 88 is horizontally retracted to the upstream end of member 76 by means of member 83, which is attached at 82 to a chain 81. Chain 81 continuously rotates about sprockets 79 and 80, thereby moving member 88 in a reciprocal manner. Since conveyor 22 is continuously moving, the amount of horizontal retraction of member 88 must be adjusted so that heating heads 89 will move back and downwardly to contact the new containers to be sealed without skipping any even though the movement of conveyor 22 has continued.

After the heat sealing operation the sealed containers are passed to a cooling zone wherein are provided individual cooling heads. Each cooling head 110 is of such a configuration that when applied to each individual container a part of the cooling head will come into contact with at least a part of the sealed portion of that container and thereby cool same. The cooling head 110 is maintained in contact with the sealed portion by suitable means.

The power supply for the overall operation of the machine is preferably a single source connected to the machine and its various drive elements in any suitable manner known in the art. However, if desired, separate power sources can be attached in a known manner to any portion of the machine. For example, separate power sources can be attached to conveyor 22, to feed rollers 44, the drive roller for band 55 and/or roller 58, to chain 81, and so on. Also, any suitable means known in the art may be utilized on the machine of this invention to render same automatic in its operation.

Figure 1A:
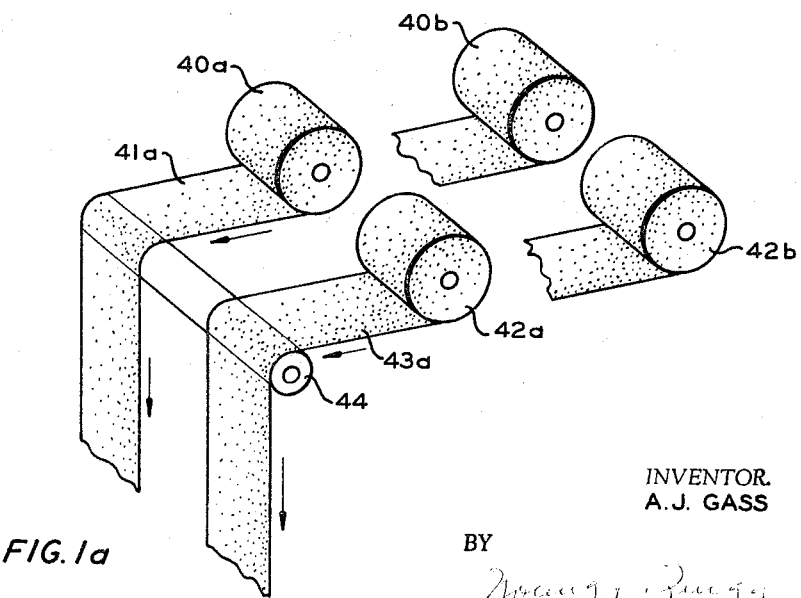
FIGURE 1A is a schematic representation of the cover material feeding arrangement utilized when more than one lane is supplied by the cover feeding, registering, applying and temporary attaching apparatus of the machine shown in FIGURE 1.

FIGURE 1A shows, for sake of simplicity, one of the two feed rollers 44 feeding cover material 41a and 43a from two feed rolls 40a and 42a. This arrangement is utilized when more than one lane is employed. Thus, single roll 40a supplies cover sheets for several parallel rows of packages in one lane while roll 42a supplies material for several cover sheets for a separate lane. However, both lanes can utilize a single feeding, corrugating, cutting, cover sheet applying and cover sheet attaching apparatus. Also, reserve rolls of cover material 40b and 42b are utilized in such a manner that if, for example, roll 40a becomes exhausted, roll 40b may be spliced onto 40a without requiring a stoppage of any of the operations of the machine. The same holds true for reserve roll 42b as regards the exhaustion of material from roll 42a.

Figure 2:
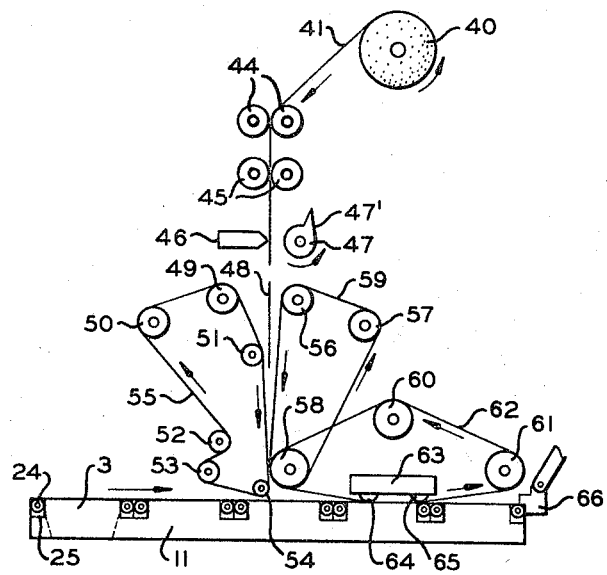
FIGURE 2 is a diagrammatic side view of the cover feeding, registering, applying and temporary attaching apparatus of the machine shown in FIGURE 1.

In FIGURE 2 there is shown a series of pockets 11 with container space 3 therein passing through the cover feeding, applying and tacking operation. In this operation there is provided a source of cover material 41 as shown by roll 40. There are also provided feed rolls 44, corrugating rolls 45, cutting means 46 and 47, differential feed belts 55 and 59, supported, respectively, upon rolls 49, 50, 51, 52, 53 and 54, and rolls 56, 57 and 58. There is also provided tacking bands 62 which are supported by rolls 58, 60 and 61, and which contact heating means 63 by means of rollers 64 annd 65. There is also provided cutting means 66.

In the operation of this section of the machine, pocket 11, containing a container filled with material to be sealed therein, is passed toward roll 54 while material 41 is fed through feed rolls 44 and corrugating rolls 45 so that said material will continue to travel downward even though its lower end is severed. When a desired length of cover material has passed through cutters 46 and 47, the timed rotation of cutter roller 47 by means known in the art and, therefore, not shown, is such that cutter bar 47' meets shear bar 46 and severs the cover material to form a unitary cover sheet 48. Sheet 48 is then fed through differential belts 55 and 59 and applied by same to the containers in pocket 11 and parallel pocket 10. The single sheet covering the containers in the two pockets is then temporarily attached to the two containers therein by passing under heating means 63. After the unitary cover sheet has been temporarily attached to both of the containers in the pockets 10 and 11, the unitary cover sheet is severed by cutting means 66, as described above. When more than two rows are covered with a single sheet, an additional cutter or cutters, similar to cutter 66, is required.

FIGURE 3 shows a movement of pockets 10 and 11 toward and through the cover feeding, applying and tacking apparatus of FIGURES 1 and 2. In FIGURE 3, there are shown pockets 10 and 11 as they progress through the cover applying operation, which includes cover source 40 supplying cover material 41 by means of feed rolls 44 and being cut into suitable length by cutters 46 and 47. In the operation shown, pockets 10 and 11 are forced transversely together by coaction of rotating means 25 and cam rail 27 to a point of closest possible physical approach of the two pocekts. At the same time, a unitary sheet of cover material has been cut and is applied to the pockets in this forced-together relationship in a manner such that the containers in both pockets are covered by the single cover sheet 48. This cover sheet is temporarily attached to both containers, as shown by reference numeral 67, and then cut by cutter 66 to yield individually covered containers, as shown by reference numerals 68. The forced together pockets 10 and 11 are then allowed to, or are forced to, transversely separate to their original spaced apart or separated condition. It should be noted that instead of cutter 66, a longitudinally perforated cover material can be used so that when pockets 10 and 11 are separated the force of separation also tears the perforated cover 48 into two individual covers 68. Also, along with cutters 46 and 47, a longitudinal perforator can be used to perforate cover material 41, so that a solid cover material can be fed to feed rolls 44, but a longitudinally perforated cover 48 is applied to pockets 10 and 11, which cover 48 can then be separated into individual covers 68 by the force separating pockets 10 and 11 transversely and without the use of cutter 66.

FIGURE 4 shows the desired placement of cutter 66 relative to roller 61, and tacking bands 62. Cutter 66 is supported by arm 66' which is mounted by means of bar 69 on roller support 69'.

In the operation of this portion of the apparatus, the packages in pockets 10 and 11 have had a single cover sheet applied thereto and temporarily attached by means of heat transfer through tacking bands 62. After the unitary cover sheet has been attached to the multiplicity of containers, the pockets containing the containers are passed to cutter 66, which severs the unitary cover sheet 48 longitudinally between pockets 10 and 11 to provide each package and each pocket 10 and 11 with separate cover sheet 68.

FIGURE 5 depicts the bottom view of bottomless pockets 10 and 11 with their interior open space 3 and rotating members 24 and 25. Pockets 10 and 11 are held together by members 12 and 13, which may be threaded into pocket 10 and loosely mounted in drilled holes in pocket 11, the two pockets being urged apart by resilient means 14 and 15. Pins 16 and 17 fit slidably into bushings 30, which are pressed into drilled holes in pockets 10 and 11. These pins provide means for connection with driving chain 18 by means of support and driving members 19 and 20, and through a slot 19', shown in FIGURE 6. Further, angle bar 26 is shown, under which roller 24 moves in order to prevent pocket 11 from deviating from a straight and level plane of travel. Also, rail cam 27 is shown, which coacts with roller 25 to force pocket 11 transversely toward pocket 10. Also, there are shown four chains 18, 21, 21' and 29, which support pockets 10 and 11 and which in turn are supported by plates represented for sake of simplicity by a single plate 23. The two chains 18 and 29 are mounted on either side of members 19 and 20 and affixed thereto to thereby provide the means through which motivating force may be tranferred to pockets 10 and 11. It is possible to use a single chain in connection with members 19 and 20, however, two chains are desirable in order to help support pockets 10 and 11. It should be noted that rotating means 24 and 25 are also provided on pocket 10 and, therefore, guides similar to bars 2 and 26 and cam 27 will be provided on the other side for coaction with rollers 24 and 25 on pocket 10. Although rollers are preferred, if desired, roller 24 can be replaced by a fixed skid block and roller 25 by a fixed cam block.

FIGURE 6 shows members 19 and 20 of FIGURE 5 and also shows slot 19' through which pins 16 or 17 slidably fit. If 19 has a slot 19', 20 may have simply a round hole through which pin 16 fits. The purpose of the slot 19' is to allow the distance between members 19 and 20 to shorten at the chain carried pockets 10 and 11 around the end sprockets 1 and 1' of FIGURE 1.

FIGURE 7 shows chain 21, which contains a roller 28 under which resides bar 23, which bar supports chain 21. A bar similar to bar 23 can be provided under each of the four chains shown in FIGURE 5.

FIGURE 8 shows a pocket 11 having in its open space 3 an empty container 3' which has a flange on the upper side thereof. This container flange rests on a resilient back-up member 11'. The back-up member is provided to support the container flange in part or all of the operations of the machine such as the heat sealing operation which is depicted in FIGURE 8 by sealing head 89. The side and end walls of the pocket can be any desirable material and configuration so long as they prevent distortion of the container walls. For example, the pocket walls can be solid or perforated, flat and tapered, or curved in any suitable fashion so as to conform and best support the container walls. Also, the pocket walls can be formed from spaced-apart ribs or a wire mesh or a series of appendages from the top of the pocket that are not connected one to the other on their lower extremities but which are sufficiently rigid to prevent container warpage.

In operation, member 11' is provided on pocket 11 prior to insertion of container 3' into space 3, so that when container 3' is so placed, member 11' is there to support the flange throughout the operation of the machine.

FIGURE 9 shows a back-up member which has been set back from the interior side of pocket 11 to allow for the curvature required to form the flange on container 3'.

FIGURE 10 shows a modification of the back-up member 11' as represented by 11", wherein the back-up member is contoured to fit the shape of the curvature between the container flange and container 3'. Desirably, the contour of back-up member 11" is equal to the longest radius normally encountered in such container flanges.

FIGURE 11 discloses a modification of the back-up member as shown by 11''', wherein said member is chamfered to accommodate the curvature between the container flange and container 3'.

FIGURE 12 shows cooling apparatus of the invention wherein is provided sprockets 100 and 101 traversed by at least chain 102. Chain 102 is attached to and supports member 107. A member 113 is in turn supported by member 107, coil spring 106 being inserted between member 107 and flange 112 on extension 105 of member 113. Rotating means 104 is rotatably mounted on extension 105. Cooling head 110 is supported from member 113 by members 109 and urged away from member 113 by resilient means 108. Cooling bar 111 and cam rail 103 are provided, as shown.

In the operation of this apparatus, a pocket 10 or 11 moves under cooling head 110 which is itself moved into contact with the container in a pocket by coaction of rotating means 104 with cam 103. Pressure of contact of cooling head 110 with container and pocket is maintained by means of resilient means 108. Upon nearing the end of cam 103 and/or sprocket 101, cooling head 110 is retracted from contact with the container and pocket and is then recooled, preferably by passing into contact with cooling bar 111, to prepare same for contact with a new and, therefore, hot heat sealed portion of a container in another pocket. The arrangement of the resilient means on the cooling head traveler can be either a coil spring and bolt arrangement such as that shown by elements 108 and 109, or these elements can be omitted and use can be made solely of a flat spring mounting.

FIGURE 13 shows a cooling or heating head configuration desirably used in the machine of this invention. In this configuration there is provided a recessed portion 110′ which will allow sealing and cooling of the periphery of the container or flange thereof and the cover even though the contents of said package is mounted to a degree that the contents extend beyond the upper surface, i.e. flange, of the container.

It should be noted that existing packaging machines can be and have been adapted to utilize this invention and its various accompanying advantages.

Reasonable variation and modification are possible within the scope of the foregoing disclosure, drawings and appended claims to the invention, the essence of which is a method and apparatus for covering a multiplicity of packages by utilizing a single unitary cover sheet which is applied and temporarily attached to said packages in said unitary condition and then severed to form individual covers for each package wherein said packages are supported on their sides by a form fitting deep walled bottomless pocket and wherein said pockets are forced together transversely to a point of closest approach during the application, temporary attaching and parting of said unitary cover member and wherein, after the parting of said unitary cover member to form individual covers, each individual package and cover member is heat sealed and wherein at least part of the heat sealed portion is force cooled by means of a cooling member which contacts and travels with the sealed portion for a predetermined time and distance and which is then retracted and cooled and applied to another heat sealed portion.

I claim:

1. A method of closing packages comprising providing at least two parallel and transversely spaced apart support pockets carrying packages, moving said spaced-apart pockets toward a covering zone and transversely toward one another until a point of closest approach of said pockets is reached, providing a single sheet of cover material sufficient to cover both of said pockets when at said point of closest approach, and applying to said packages said single cover sheet.

2. A method of sealing packages comprising providing at least two longitudinally parallel and transversely spaced apart support pockets each containing a package, simultaneously moving said spaced-apart pockets longitudinally toward a covering zone and transversely toward one another until a point of closest approach of said pockets is reached, providing a single sheet of cover material sufficient to cover both of said pockets when at said point of closest approach, applying to said transversely forced-together pockets said single cover sheet, temporarily attaching said cover sheet to both of said packages in said parallel and transversely forced-together pockets, parting said cover sheet between said pockets.

3. A continuous method of sealing packages comprising providing at least two longitudinally parallel and transversely spaced apart, bottomless support pockets the interior walls of which have sufficient depth and shape to substantially completely support the outer walls of a package, placing empty packages in said pockets, filling said packages, simultaneously moving said spaced-apart pockets longitudinally toward a covering zone and transversely toward one another until a point of closest approach of said pockets is reached, providing a unitary sheet of cover material of sufficient length and width to cover both of said pockets when at said point of closest approach, concurrently with the passing of said pockets through said covering zone registering with and applying to said packages said unitary cover sheet, temporarily attaching said cover sheet to both of said packages in said parallel pockets at their point of closest approach, longitudinally cutting said cover sheet between said pockets.

4. A continuous method of sealing packages comprising providing at least two longitudinally parallel and transversely spaced apart, bottomless support pockets the interior walls of which have sufficient depth and shape to substantially support the walls of a package, placing an empty package in each of said pockets, filling said packages, simultaneously moving said spaced-apart pockets longitudinally toward a covering zone and transversely toward one another until a point of closest approach of said pockets is reached, providing a single sheet of cover material of sufficient length and width to cover both of said packages in said pockets when said pockets are at said point of closest approach, concurrently with the passing of said pockets through said covering zone registering with and applying to said packages said single cover sheet, temporarily attaching said cover sheet to both of said packages in said parallel pockets when at their point of closest approach, longitudinally cutting said cover sheet between said pockets, transversely separating said pockets to their original spaced-apart relation, contacting each of said covered packages with a sealer to seal said temporarily attached cover to said package.

5. A continuous method of sealing packages comprising providing at least two longitudinally parallel and transversely spaced apart, bottomless support pockets the interior walls of which have sufficient contour to substantially completely cover and support the walls of a package, placing an empty package in each of said pockets, filling said packages, simultaneously moving said spaced-apart pockets longitudinally toward a covering zone and transversely toward one another until a point of closest approach of said pockets is reached, providing a single sheet of cover material of sufficient area to cover both of said pockets when at said point of closest approach, concurrently with the passing of said pockets through said covering zone registering with and applying to said packages said single cover sheet, temporarily attaching said cover sheet to both of said packages in said parallel pockets at their point of closest approach, longitudinally cutting said cover sheet between said pockets, transversely separating said pockets to their original spaced-apart relation, passing said spaced apart pockets to and through a sealing zone, applying to the sealed portions of said packages an article of lower temperature than said sealed portions, and removing said article from said sealed portions.

6. A continuous method of sealing thermoplastic packages comprising providing at least two longitudinally parallel and transversely spaced apart, bottomless support pockets the interior walls of which have sufficient depth and shape to substantially completely cover and support the outer vertical walls of a thermoplastic package, placing an empty thermoplastic package in each of said pockets in a manner such that all sides of said package substantially completely abut and are substantially completely supported by the shaped interior walls of said pockets, filling said packages with material, simultaneously moving said spaced-apart pockets longitudinally toward a covering zone and transversely toward one another until a point of closest approach of said pockets is reached, providing a single sheet of cover material of sufficient length and width to cover at least both of said packages in said pockets when said pockets are at said point of closest approach, concurrently with the passing of said pockets through said covering zone registering with and applying to said packages said single cover sheet, temporarily attaching said cover sheet to both of said packages in said parallel pockets while said pockets are at their point of closest approach, longitudinally cutting said cover sheet between said pockets to form individual covers on each package, transversely separating said pockets to their original spaced-apart relation, passing said spaced-apart pockets to and through a heat sealing zone, in said sealing zone contacting each of said covered packages with a moving heat source to seal each temporarily attached individual cover to each package, moving said pockets to a cooling zone, in said cooling zone applying to the sealed portions of each package an article of lower temperature than said sealed portions, maintaining said cool article in contact with said sealed portions while said pockets move through said cooling zone and removing said article from said sealed portions when said pockets reach the end of said cooling zone, removing the sealed packages from said pockets and returning said pockets to receive other empty packages.

7. Apparatus for closing packages comprising at least two parallel and transversely spaced apart pocket means for holding and supporting a filled package on substantially all of the sides of said package, means for moving said pockets longitudinally forward, means for transversely forcing said pockets toward one another, means for applying a unitary sheet of cover material of sufficient area to substantially cover said transversely forced together pockets.

8. Apparatus for continuously sealing packages comprising at least two longitudinally parallel and transversely spaced apart bottomless pocket means for holding and supporting an empty package on substantially all of the sides thereof, means for simultaneously conveying said pockets longitudinally forward and transversely toward one another to a point of closest approach of said pockets, a single means for registering and applying a single sheet of cover material of sufficient length and width to substantially cover said pockets while at said point of closest approach, means for temporarily attaching said single sheet to both said packages in said parallel pockets at their point of closest approach, means for longitudinally severing said single sheet between said pockets to produce two covers on two separate packages.

9. Apparatus for continuously sealing packages comprising at least two longitudinally parallel and transversely spaced apart bottomless pocket means for holding and supporting a package on substantially all of the sides thereof, means for simultaneously moving said pockets longitudinally forward in a continuous manner, means for forcing said parallel pockets transversely toward one another to a point of closest approach, means for providing a single sheet of cover material of sufficient length and width to substantially cover said pockets while at said point of closest approach, a single means for registering said single sheet with said packages and applying said cover thereto, means for temporarily attaching said single sheet to both said packages in said parallel pockets at their point of closest approach, means for longitudinally severing said single sheet between said pockets to produce two individual covers on two separate packages in two separate pockets, means for transversely separating said pockets to their original spaced-apart relation, and means for heat sealing said individual covers onto said packages.

10. Apparatus for continuously sealing packages comprising at least two longitudinally parallel and transversely spaced apart bottomless pocket means for holding and supporting a package on substantially all of the sides of said package, means for simultaneously moving said pockets longitudinally forward and transversely toward one another to a point of closest approach of said pockets, means for feeding a single sheet of cover material of sufficient length and width to substantially cover said pockets while at said point of closest approach to a single means for registering said single sheet with said packages and applying said single sheet thereto, means for attaching said cover to both said packages in said parallel pockets while at their point of closest approach, means for longitudinally severing said single sheet to produce two individual covers on two separate packages, means for transversely separating said pockets to their original spaced-apart relation, means for heat sealing said individual covers onto said packages while said packages are continuously conveyed, means for cooling substantially all seals produced by said heat sealing means by contacting said seal with a low temperature means as the pockets continue to move longitudinally.

11. Apparatus for continuously sealing thermoplastic packages comprising at least two longitudinally parallel and transversely spaced apart bottomless pocket means for holding and supporting an empty thermoplastic package on substantially all of the exterior sides of said package, means for continuously conveying said pocket means, means for filling said package in each of said pocket means, means for moving said pockets transversely toward one another to a point of closest approach of said pockets simultaneously with said continuous conveying, means for feeding and cutting a single sheet of cover material of sufficient length and width to substantially cover said pockets while at said point of closest approach, a single means for registering said single cover sheet with said packages and applying said cover sheet thereto, means for temporarily attaching said cover sheet to both said packages in said parallel pockets at their point of closest approach, means for longitudinally severing said single cover sheet between said pockets to produce two individual cover sheets on two separate packages in two separate pockets, means for transversely separating said pockets to their original spaced-apart relation, retractable longitudinally moving means for simultaneously heat sealing each of said individual cover sheets onto said packages, means for cooling substantially all seals produced by said heat sealing means which includes means for contacting said seals with a low temperature means for a fixed time period, and means for removing said low temperature means from said seal and moving said low temperature means to a position to contact a freshly sealed portion of a package in another pocket, and means for removing the sealed packages from said pockets and means for returning said pockets to a position to receive more empty packages.

12. A packaging machine comprising a conveyor, pockets attached in at least two parallel rows to said conveyor and adapted to support the walls of packages therein, means to transversely force parallel pockets together, means to apply a unitary sheet to said forced-together pockets, and means to sever said single sheet.

13. A packaging machine comprising a conveyor, pockets attached in at least two parallel rows to said conveyor and adapted to hold and support the walls of packages therein, means to transversely force parallel pockets together, means to feed and apply a single cover sheet to said packages in said forced-together pockets, means to attach said single cover sheet to said parallel packages, means to sever said single cover sheet between said pockets, resilient means to transversely force said parallel pockets apart, means to seal each portion of said severed cover to each package, cooling means to cool each seal produced by said heat sealing means.

14. A packaging machine comprising a conveyor, pockets attached in at least two parallel rows to said conveyor and adapted to support the walls of packages therein, means to transversely force parallel pockets together, means to apply a unitary cover sheet to said forced-together parallel pockets, means to sever said cover sheet, means to seal said severed cover to each package, means to cool each seal produced by said heat sealing means comprising at least one cooling head resiliently supported on a traveler, rotating means attached to said traveler at the opposite end from said cooling head, a tapered guide bar adapted to coact with said rotating means and force said cooling head into contact with said seals produced, a pair of sprockets horizontally separated in the same plane, at least one chain attached to said traveler and extending around and between said pair of sprockets, and a cooling means to cool said cooling head.

15. A packaging machine comprising a conveyor to continuously move at least two parallel rows of open packages, pockets attached in at least two parallel rows to said conveyor and adapted to hold and support the side and end walls of said open packages, means to transversely force parallel pockets together comprising a tapered guide bar, means to feed, register and apply a single cover sheet to said open packages in said forced-together pockets, heating means to temporarily attach said single cover sheet to said open parallel packages, means to sever said single cover sheet between said pockets, resilient means to transversely force said parallel pockets apart, heat sealing means to seal said severed cover sheet to each package in each pocket, cooling means to cool each seal produced by said heat sealing means comprising at least one recessed cooling head resiliently supported on a traveler, a roller attached to said traveler at the opposite end from said cooling head, a tapered guide bar adapted to coact with said roller and force said cooling head into contact with said seals, a pair of sprockets horizontally separated in the same plane, at least one chain attached to said traveler and extending around and between said pair of sprockets, and a cooling means to cool said cooling head.

References Cited

UNITED STATES PATENTS

| | | | |
|---|---|---|---|
| 409,481 | 8/1889 | Mantion et al. | 53—202 X |
| 2,133,348 | 10/1938 | Ferenci | 53—388 |
| 3,177,106 | 4/1965 | Seefluth et al. | 53—39 X |
| 3,238,691 | 3/1966 | Miller et al. | 53—184 X |
| 3,246,448 | 4/1966 | Amic | 53—388 X |

TRAVIS S. McGEHEE, *Primary Examiner.*

FRANK E. BAILEY, *Examiner.*

L. S. BOUCHARD, R. L. FARRIS, *Assistant Examiners.*